US006198064B1

(12) United States Patent
Fujiwara

(10) Patent No.: US 6,198,064 B1
(45) Date of Patent: Mar. 6, 2001

(54) TERMINAL FOR ELECTRIC WIRE WELDING AND WELDING TORCH SUITABLE FOR ELECTRIC WIRE WELDING TO THE TERMINAL

(75) Inventor: Toshimitsu Fujiwara, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/294,159

(22) Filed: Apr. 19, 1999

(30) Foreign Application Priority Data

Apr. 19, 1998 (JP) ........................................ 10-123951

(51) Int. Cl.[7] ........................................ B23K 9/167
(52) U.S. Cl. ........................................ 219/56.21; 219/75
(58) Field of Search ........................ 219/75, 127, 56.22, 219/56.1, 56.21; 361/809

(56) References Cited

U.S. PATENT DOCUMENTS

| | | | | |
|---|---|---|---|---|
| 2,683,791 | * | 7/1954 | Ruehlemann et al. | 219/127 |
| 3,703,623 | * | 11/1972 | Swengel, Sr. | 219/56.22 |
| 5,451,736 | * | 9/1995 | Fiedler et al. | 219/56.22 |
| 5,847,937 | * | 12/1998 | Cepa et al. | 361/809 |
| 5,908,568 | * | 6/1999 | Dittmann et al. | 219/56.22 |

* cited by examiner

*Primary Examiner*—Clifford C. Shaw
(74) *Attorney, Agent, or Firm*—Morrison & Foerster LLP

(57) ABSTRACT

A pad piece is unitedly formed on a wrapping terminal to be contacted by an electrode probe and positioned to be opposed to a welding torch, and the electrode probe is held by the welding torch to approach a wrapping terminal, whereby the electrode probe held by the welding torch is automatically brought into contact with the pad piece of the wrapping terminal as the welding torch approaches the wrapping terminal to complete potential fixing.

3 Claims, 4 Drawing Sheets

TERMINAL FOR ELECTRIC WIRE WELDING AND WELDING TORCH SUITABLE FOR ELECTRIC WIRE WELDING TO THE TERMINAL

BACKGROUND OF THE INVENTION

1. Field of the Invention

This invention relates to a terminal for electric wire welding suitable for a use of connecting a wire to a terminal in the manufacturing process of an electric or electronic device, such as electromagnetic relay or the like, and a welding torch suitable for electric wire welding to the terminal.

2. Description of the Prior Art

According to a conventional coil wire and terminal connection method in manufacturing an electromagnet for a small size relay, one end of the coil wire wound around a spool is wrapped around a wrapping terminal projecting from a flange of the spool to be fixed by soldering. The soldering is performed by dipping the wrapping terminal wound by the coil wire into fusion solder. The conventional wrapping terminal has a simple rod-shaped projection. Since the conventional connection method of the wrapping terminal employs solder, environmental pollution with lead is a concern.

Instead of the above-mentioned connection employing solder, the adoption of arc welding free from environmental pollution with lead has been examined. A model of a conventional connection method of a wrapping terminal by arc welding is embodied in FIG. 4 which shows a torch 1 providing an arc welding machine, a support member 2 for supporting the torch, a direct current power supply 3 for the arc welding machine, a spool 4 wound by a coil wire 7, flanges 4*a* disposed on both ends of the spool 4, wrapping terminals 5 planted on the spool 4 and wrapped by ends of the coil wire 7, an electrode probe 6 for fixing the potential of the wrapping terminals 5 toward positive potential prior to welding, and lower projections 8 electrically conductive with the terminals 5.

The arc welding connection method requires, as a preceding procedure to the execution of welding, a first production process in which the wrapping terminal 5 is vertically positioned upward and the support member 2 is moved up and down as shown by an arrow mark 10 to position a top end of an electrode rod 9 held by the torch 1 near a top end of the terminals 5, and a second production process in which the probe 6 is horizontally moved forward-and-backward as shown by an arrow mark 11 to bring the end of the probe 6 into contact with the lower projection 8.

The above-mentioned method requires two positioning mechanisms for positioning the vertical orientation of the electrode rod 9 and the horizontal direction of the probe 6, and the framing of the welding arrangement becomes complicated. Since the two step positioning process is necessary before welding, productivity is lowered.

SUMMARY OF THE INVENTION

It is, therefore, a primary object of this invention to simplify the framing of a welding arrangement to improve the productivity of a welding operation.

According to a first aspect of this invention, there is provided a terminal for electric wire welding which includes a terminal projection to be welded with an electric wire and an electrode pad piece having a portion cropped out toward a projection side of the terminal projection, that are formed as a single unit.

According to a second aspect of this invention, there is provided a welding torch holding an electrode probe as a single unit, which is arranged to fit together with the terminal projection and the electrode pad piece when the welding torch is located above the terminal projection.

According to a third aspect of this invention, there is provided a welding torch of the second aspect of this invention in which the electrode probe is supported for forward-and-backward movement in an axial direction of an electrode rod and biased in the forward direction thereof.

Thus, according to this invention, the electrode probe automatically comes into contact with the electrode pad piece by coaxially bringing the electrode rod held by the torch on the terminal projection of a welded wire connection terminal, thereby simplifying the positioning mechanism and simultaneously reducing the number of steps for positioning. According to the third aspect of this invention, the electrode probe comes into contact with the electrode pad piece, while the gap between the electrode rod and the terminal projection can be adjusted.

BRIEF DESCRIPTION OF THE DRAWINGS

A better understanding of this invention may be had from a consideration of the following detailed description, taken in conjunction with the accompanying drawings in which.

DETAILED DESCRIPTION OF THE PREFERRED EMBODIMENTS

Figure 1:
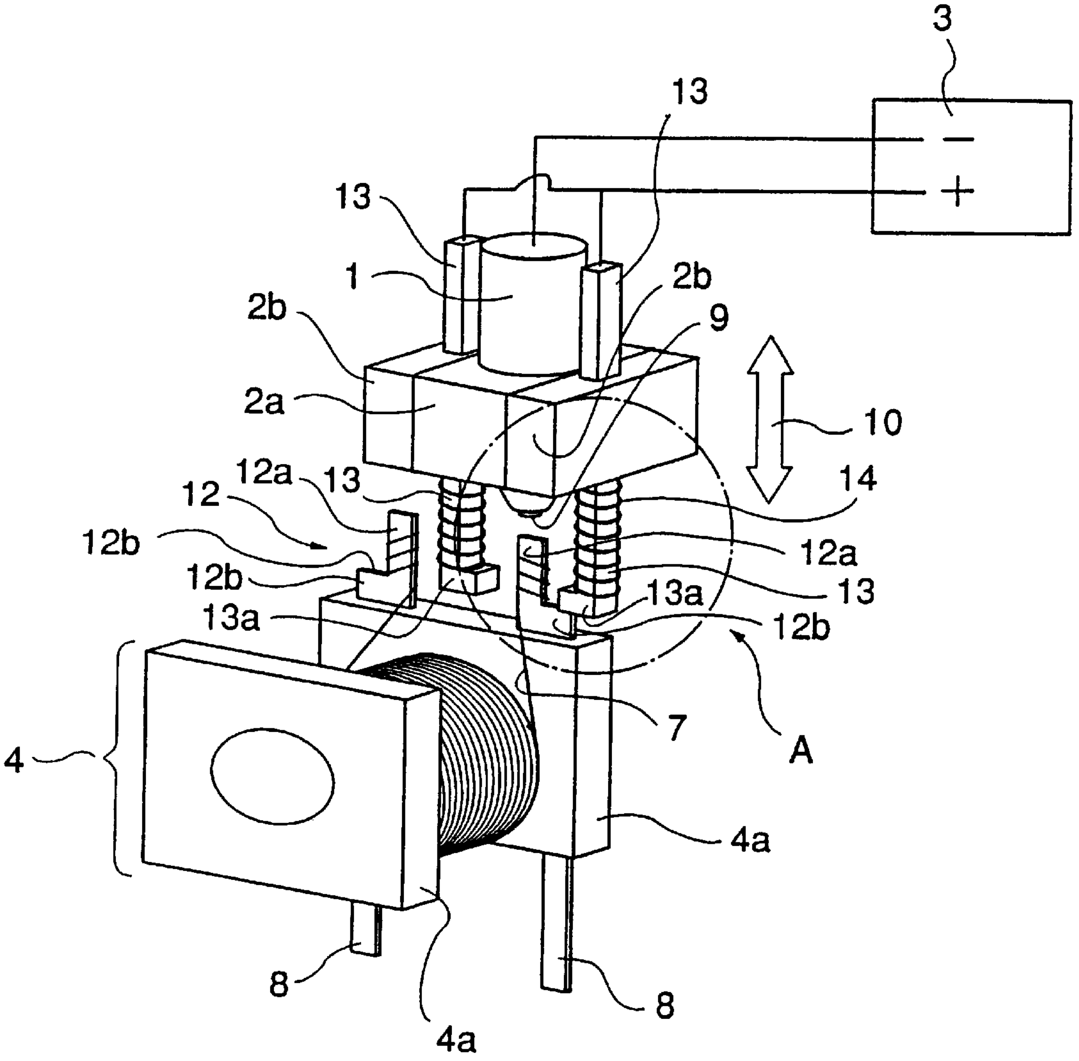
FIG. 1 is a perspective schematic view of an electromagnet and a welding torch to show a welding manufacturing process of a wrapping terminal according to this invention.
Figure 4:
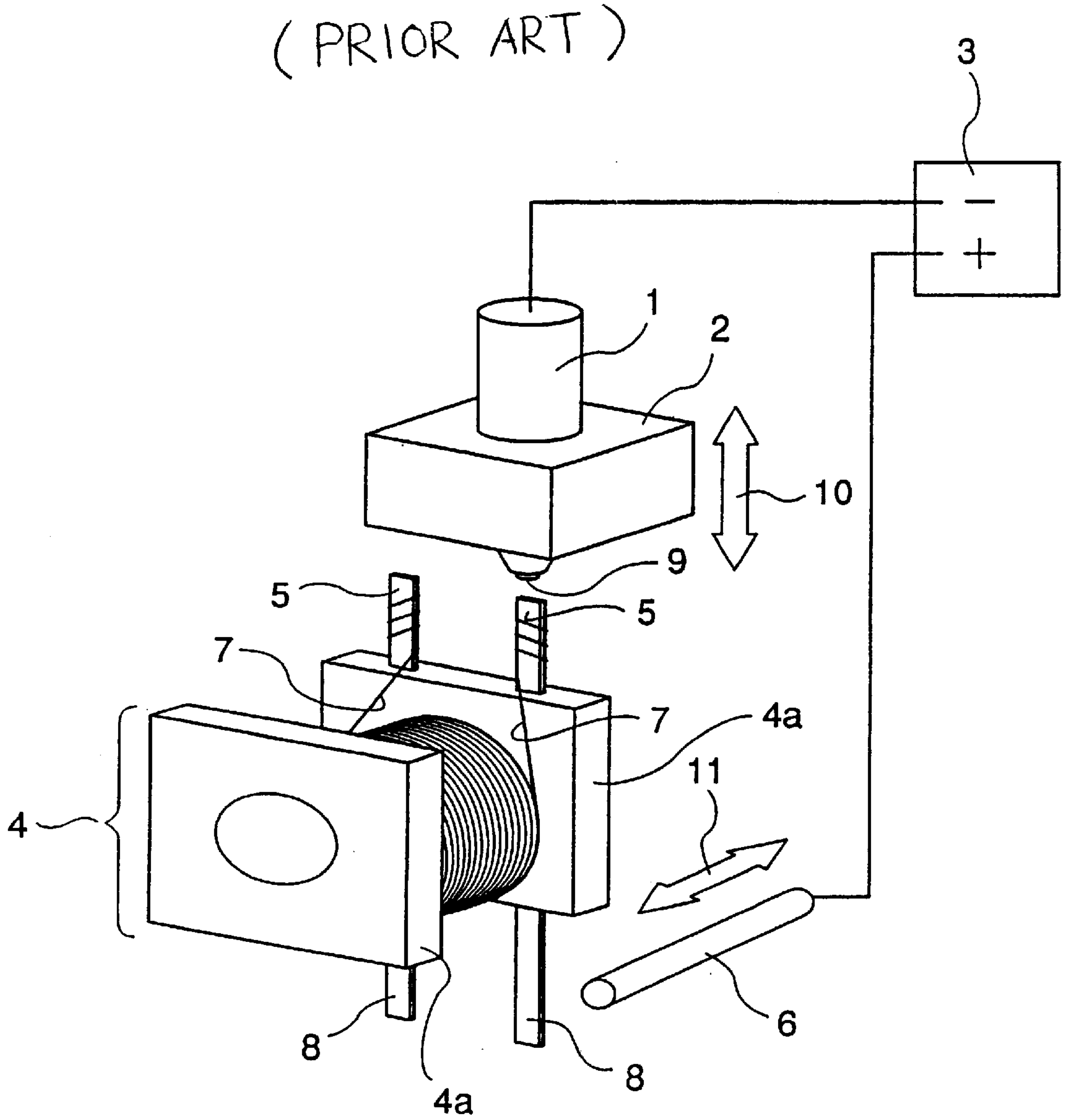
Fig. 4 (PRIOR ART)
FIG. 4 is a perspective schematic view of an electromagnet and welding torch to show a conventional manufacturing process of a wrapping terminal.

Returning, now, to FIG. 1, there are schematically shown an electromagnet and a welding torch to explain a welding method about a wrapping terminal as a preferred embodiment of this invention. The same components as those of FIG. 4 are given the same reference numerals, and their detailed explanation is omitted. As shown in FIG. 1, a wrapping terminal 12 of this embodiment includes long and narrow terminal projections 12*a* vertically projecting upward in the drawing and wound by ends of a coil wire 7, and electrode pad pieces 12*b* horizontally extending from bases of the terminal projections 12*a*. Upper surfaces 12*b*' (surfaces cropped out toward the projecting sides of terminal projections 12) of the electrode pad pieces 12*b* serve as contact faces with later described electrode probes 13.

Figure 2:
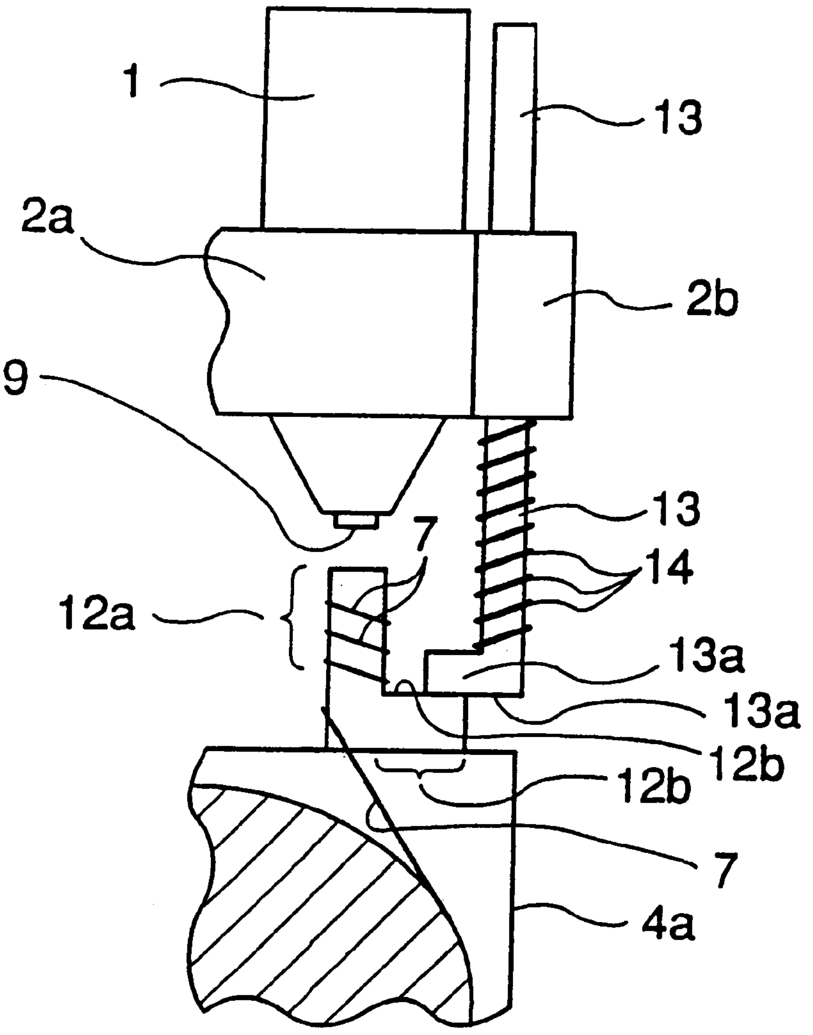
FIG. 2 is an enlarged view of a section A of FIG. 1.

On the welding machine side, a pair of support members 2*b* for electrode probes 13 are fixed across a support member 2*a* of a torch 1 to sandwich the same as a single unit. The rod-shaped electrode probes 13 are supported by the support members 2*b* for a forward-and-backward movement (slidably) by a predetermined stroke to vertically pierce the members 2*b* respectively, and urged toward a forward direction (a projecting direction) by rebound forces of coil springs 14 coaxially inserted by the probes. The electrode probes 13 at their top ends (lower ends) are provided with horizontal projections 13*a* (see FIG. 2), and lower faces 13*a*' of the horizontal projections 13*a* serve as contact faces with the electrode pad pieces 12*b*.

It should be noted that the location relationship of the electrode rod 9 held by the torch 1 and the electrode probes 13 is consistent with the location relationship of the terminal projections 12*a* and the electrode pad pieces 12*b* in a horizontal plane. Particularly, the distance in a horizontal direction between a central axis of the electrode rod 9 and a predetermined position of the horizontal projection 13*a* of the electrode probe 13 is designed to be substantially equal to the distance in a horizontal direction between a central axis of the terminal projection 12*a* and a predetermined position of the electrode pad piece 12*b*.

According to the above-described construction, when the electrode rod 9 is vertically lowered as shown by the arrow mark 10 while the central axis of the electrode rod 9 held by the torch 1 is adjusted to the central axis of the terminal projection 12*a* after the spool 4 wound by the coil wire is supported so that the terminal projection 12*a* may be positioned upward, first the lower face 13*a*' of the horizontal projection 13*a* of the electrode probe 13 comes into contact with the upper face 12*b*' of the electrode pad piece 12*b* of the wrapping terminal 12. As the electrode rod 13 is lowered further, the electrode rod 13 goes back with keeping the contact and resisting against the rebound force by the coil spring 14, while the distance between the lower end of the electrode rod 9 and the upper end of the terminal projection 12*a* can be properly adjusted. Thus, as the electrode rod 9 is initiated to be electrically energized, an arc is made between the lower end of the electrode rod 9 and the terminal projection 12*a* to melt a predetermined length of top end of the terminal projection 12 for completing the connection of the coil wire 7 with the terminal projection 12. According to this joining method, there is no fear of environmental pollution by lead.

Figure 3:
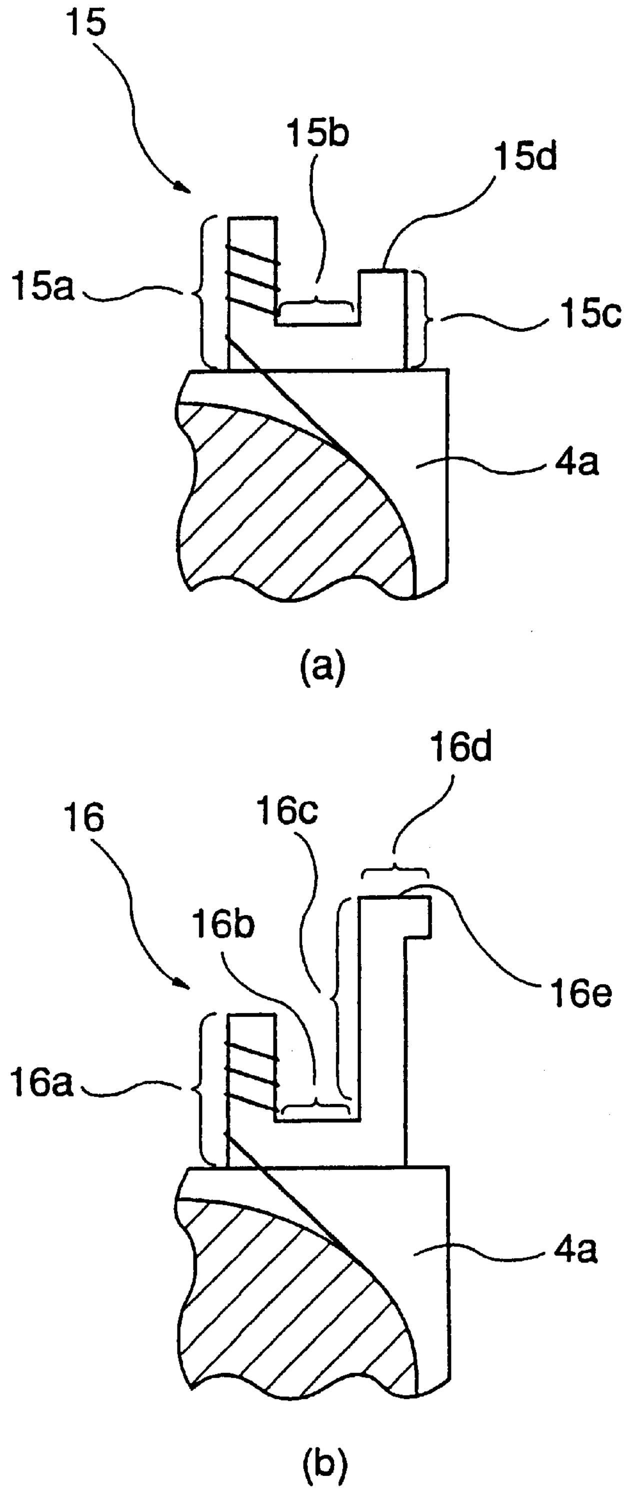
FIG. 3 shows several modifications of the terminal for electric wire welding according to this invention.

It is essential to the wrapping terminals to have the terminal projections to be welded with the coil wire, and the electrode pad pieces having a portion exposed toward the projecting direction of the terminal projections and formed with the terminal projections as a single unit. Various kinds of modifications to this structure may be provided as shown in FIG. 3. In FIG. 3(*a*), a wrapping terminal 15 includes a vertically and upwardly projecting terminal projection 15*a* and an electrode pad piece of a special form. The electrode pad piece is provided with a horizontal portion 15*b* horizontally extending from a base portion of the terminal projection 15*a* by a predetermined distance, and a vertical portion 15*c* vertically projecting upward from a top end of the horizontal portion 15*b*. The vertical portion 15*c* is lower than the terminal projection 15*a*. An upper face 15*d* of the vertical portion 15*c* serves as a contact face for the electrode probe. Needless to say, a dielectric strength design is so made that any arc may not be made between the electrode rod 9 and the top end of the vertical portion 15*c* when an arc is made between the electrode rod 9 and the terminal projection 15*a*. Since a distance between the electrode rod 9 and the top of terminal projection 15*a* is shorter than a distance between the electrode rod 9 and the top of the vertical portion 15*c*, an arc is prevented from being made between he electrode rod 9 and the vertical portion 15*c*. A partition portion may be provided as a part of said spool 4 in a gap between the electrode rod 9 and the vertical portion 15*c*. In FIG. 3(*b*), a wrapping terminal 16 includes a vertically and upwardly projecting terminal projection 16*a* and an electrode pad piece of a special form. The electrode pad piece is provided with a horizontal portion 16*b* horizontally extending from a base portion of the terminal projection 16*a* by a predetermined distance, and a vertical portion 16*c* vertically projecting upward from a top end of the horizontal portion 16*b*. The vertical portion 16*c* is higher than the terminal projection 16*a*. An upper face 16*e* of the horizontal portion 16*d* serves as a contact face for the electrode probe. Needless to say, a dielectric strength design is so made that any arc may not be made between the electrode rod 9 and the projection portions 16*b*, 16*c* and 16*d* when an arc is made between the electrode rod 9 and the top end of the terminal projection 16*a*, as mentioned above referring to FIG. 3(*a*).

In the foregoing description, this invention has been applied to welding a coil wire with a wrapping terminal in a production manufacturing process of a coil for an electromagnet, but, as for this invention, its application is widely possible in connection with a general terminal piece and lead wire. For example, after a lead wire pierces an aperture of a conventional aperture bearing terminal piece to be temporarily hooked, it is approached by a welding torch and the lead wire can be connected with the terminal piece by arc welding.

Thus, arc welding according to this invention can promote efficiency of work for welding an electric wire to a terminal piece and reduce the cost of the equipment.

What is claimed:

1. A welding station, comprising:

a terminal for electric wire welding having a terminal projection adapted to be welded with an electric wire contacting said terminal projection, said terminal projection projecting from a base in a projection direction, and an electrode pad piece extending from said base laterally to said projection direction and having a pad contact surface facing toward said projection direction, wherein said terminal projection and said electrode pad piece are formed as a single unit.

2. The welding station of claim 1, further comprising:

a welding torch comprising an electrode rod that confronts said terminal projection, and an electrode probe having a probe contact surface that contacts said pad contact surface when said electrode rod confronts said terminal projection.

3. The terminal of claim 2, wherein said electrode probe is supported by said welding torch for forward and backward movement along a longitudinal axial direction of said electrode rod and is forwardly biased in said axial direction.

* * * * *